United States Patent
Kawamura

(10) Patent No.: US 9,395,843 B2
(45) Date of Patent: Jul. 19, 2016

(54) ELECTRONIC DEVICE AND CONTROL PROGRAM

(71) Applicant: FUJITSU LIMITED, Kawasaki-shi, Kanagawa (JP)

(72) Inventor: Yoshimasa Kawamura, Atsugi (JP)

(73) Assignee: FUJITSU LIMITED, Kawasaki (JP)

(*) Notice: Subject to any disclaimer, the term of this patent is extended or adjusted under 35 U.S.C. 154(b) by 171 days.

(21) Appl. No.: 14/256,512

(22) Filed: Apr. 18, 2014

(65) Prior Publication Data

US 2015/0002479 A1 Jan. 1, 2015

(30) Foreign Application Priority Data

Jun. 26, 2013 (JP) ................................ 2013-134187

(51) Int. Cl.
*G06F 3/041* (2006.01)
*G06F 3/0485* (2013.01)
*G06F 3/0488* (2013.01)

(52) U.S. Cl.
CPC ............ *G06F 3/0418* (2013.01); *G06F 3/0414* (2013.01); *G06F 3/0416* (2013.01); *G06F 3/0485* (2013.01); *G06F 3/04883* (2013.01)

(58) Field of Classification Search
None
See application file for complete search history.

(56) References Cited

U.S. PATENT DOCUMENTS

| | | | |
|---|---|---|---|
| 2006/0197753 A1* | 9/2006 | Hotelling | G06F 1/1626 345/173 |
| 2007/0080953 A1 | 4/2007 | Lii | |
| 2011/0242038 A1* | 10/2011 | Kakuta | G06F 3/0418 345/173 |
| 2012/0105367 A1 | 5/2012 | Son et al. | |
| 2013/0063364 A1 | 3/2013 | Moore | |
| 2013/0106729 A1* | 5/2013 | Ohta | G06K 9/00416 345/173 |
| 2013/0201129 A1* | 8/2013 | Inamoto | G06F 3/04886 345/173 |

FOREIGN PATENT DOCUMENTS

| | | |
|---|---|---|
| EP | 1736856 | 12/2006 |
| JP | 2005-018669 | 1/2005 |
| JP | 2006-268073 | 10/2006 |
| JP | 2011-086191 | 4/2011 |

OTHER PUBLICATIONS

EESR—Extended European Search Report of EP Patent Application 14166203.1 mailed Dec. 17, 2014.

* cited by examiner

*Primary Examiner* — Ryan A Lubit
(74) *Attorney, Agent, or Firm* — Fujitsu Patent Center

(57) ABSTRACT

In an electronic device, a pressure correcting unit corrects press pressure of a contact object on a touch panel unit based on a parameter of a contact area of the contact object on the touch panel unit, to thereby calculate a corrected pressure parameter. A process control unit determines whether confirmation operation is performed based on the corrected pressure parameter and a threshold.

3 Claims, 6 Drawing Sheets

ELECTRONIC DEVICE AND CONTROL PROGRAM

CROSS-REFERENCE TO RELATED APPLICATION(S)

This application is based upon and claims the benefit of priority of the prior Japanese Patent Application No. 2013-134187, filed on Jun. 26, 2013, the entire contents of which are incorporated herein by reference.

FIELD

The embodiments discussed herein are related to an electronic device and a control program.

BACKGROUND

Conventionally, electronic devices (for example, mobile terminals) provided with a touch panel and a press-pressure sensor are known. In such electronic devices, in some cases, a process is received only after it is only detected that an icon or the like displayed on the touch panel is touched and the touch panel is pressed with pressure of a certain amount or more, rather than when it is only detected that an icon or the like displayed on the touch panel is touched. With this control, because a process is not received when the touch panel is only touched but is received only after the touch panel is touched and the touch panel is pressed with pressure of a certain amount or more, it is possible to reduce the frequency of erroneous operation by a user. A conventional example is described in Japanese Laid-open Patent Publication No. 2011-86191.

However, users, in particular, elderly people, who are not familiar with operation apply more pressure than necessary during the operation, and in some cases, the users may press the touch panel with pressure of the certain amount or more while trying to perform scroll operation. Therefore, while the users are just trying to perform scroll operation, the electronic device may determine that confirmation operation to execute a process is performed. As a result, the users may perform erroneous operation, and the convenience for the users may be reduced.

SUMMARY

According to an aspect of an embodiment, an electronic device includes a touch panel; a memory; and a processor. The processor is connected to the memory, calculates a corrected pressure parameter by correcting a parameter of pressure applied by a contact object to the touch panel based on a parameter of a contact area of the contact object on the touch panel, and determines whether certain operation is performed based on the corrected pressure parameter and a threshold.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT(S)

Figure 1:
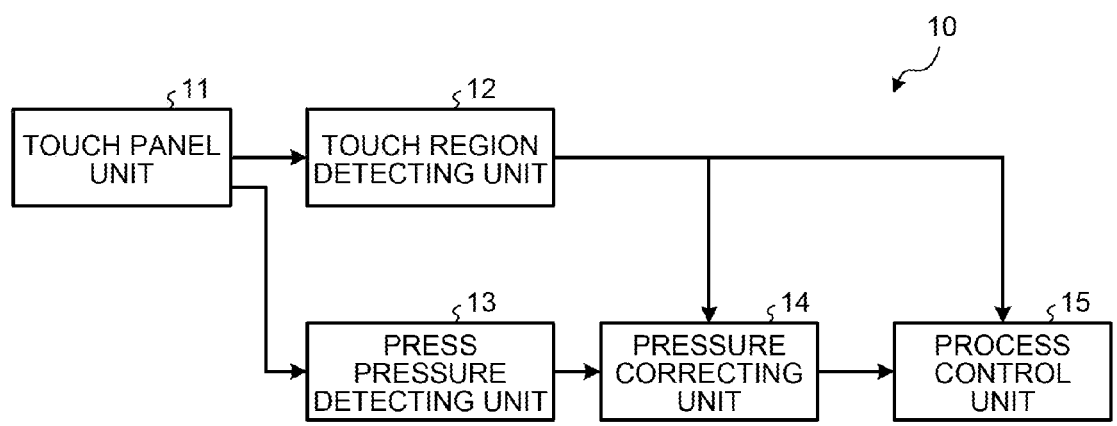
FIG. 1 is a block diagram illustrating an example of an electronic device according to a first embodiment.

Preferred embodiments of the present invention will be explained with reference to accompanying drawings. The electronic device and the control program of the disclosed technology are not limited by the embodiments below. The components with the same functions in the embodiments will be denoted by the same reference numerals and symbols, and the same explanation will not be repeated.

[a] First Embodiment

Configuration Example of Electronic Device

FIG. 1 is a block diagram illustrating an example of an electronic device according to a first embodiment. In FIG. 1, an electronic device 10 includes a touch panel unit 11, a touch region detecting unit 12, a press pressure detecting unit 13, a pressure correcting unit 14, and a process control unit 15. The electronic device 10 is, for example, a mobile terminal.

The touch panel unit 11 outputs a capacitance of each of unit regions, which are multiple divided regions of a surface (i.e., touch target surface) of the touch panel unit 11, to the touch region detecting unit 12 and the press pressure detecting unit 13.

The touch region detecting unit 12 detects a "contact position" and a "parameter of the contact area" based on the capacitance of each of the unit regions received from the touch panel unit 11. The "contact position" indicates a position on the surface of the touch panel unit 11 touched by a contact object such as a user's finger, and the "contact area" is the area of a region (i.e., a "contact region") on the surface of the touch panel unit 11 touched by the contact object such as a user's finger. The "parameter of the contact area" may be the contact area as it is, or may be a long diameter of the contact region. Incidentally, the contact area obtained by touching the touch panel unit 11 with a tip of a finger is smaller than the contact area obtained by touching the touch panel unit 11 with a pad of a finger. Namely, it becomes possible to distinguish whether the touch panel unit 11 is touched by the tip of the finger or by the pad of the finger based on the contact area. Furthermore, the contact region touched by the pad of the finger has an elliptical shape or a shape similar to an ellipse. In contrast, the contact region touched by the tip of the finger has a circular shape or a shape similar to a circle. The short diameter of the ellipse and the diameter of the circle correspond to the width of the finger and therefore approximately coincide with each other. In contrast, the long diameter of the ellipse is longer than the diameter of the circle. Namely, the long diameter of the contact region can be used mainly as the parameter of the contact area. In the following, an example will be explained in which the long diameter of the contact region is mainly used as "the parameter of the contact area".

The touch region detecting unit 12 outputs the detected contact position and the detected parameter of the contact area to the pressure correcting unit 14 and the process control unit 15.

The press pressure detecting unit 13 detects "press pressure" based on the capacitance of each of the unit regions received from the touch panel unit 11. For example, the press pressure detecting unit 13 calculates an amount of change in the total capacitance received from the touch panel unit 11 and converts the calculated amount of change into a pressure value to thereby obtain the "press pressure".

The press pressure detecting unit 13 outputs the detected press pressure to the pressure correcting unit 14.

The pressure correcting unit 14 corrects the press pressure received from the press pressure detecting unit 13 based on the parameter of the contact area received from the touch region detecting unit 12, to thereby calculate a "corrected pressure parameter". For example, the pressure correcting unit 14 calculates the corrected pressure parameter by reducing the press pressure as the parameter of the contact area increases. For example, the pressure correcting unit 14 multiplies the press pressure received from the press pressure detecting unit 13 by the inverse of the parameter of the contact area received from the touch region detecting unit 12, to thereby calculate the corrected pressure parameter. For example, the pressure correcting unit 14 may calculate the corrected pressure parameter by Equations (1) and (2) below.

$$P_{after\ correction} = P_{before\ correction} \times 1/\beta \quad (1)$$

$$\beta = A \times \text{adjustment factor} \quad (2)$$

Figure 2:
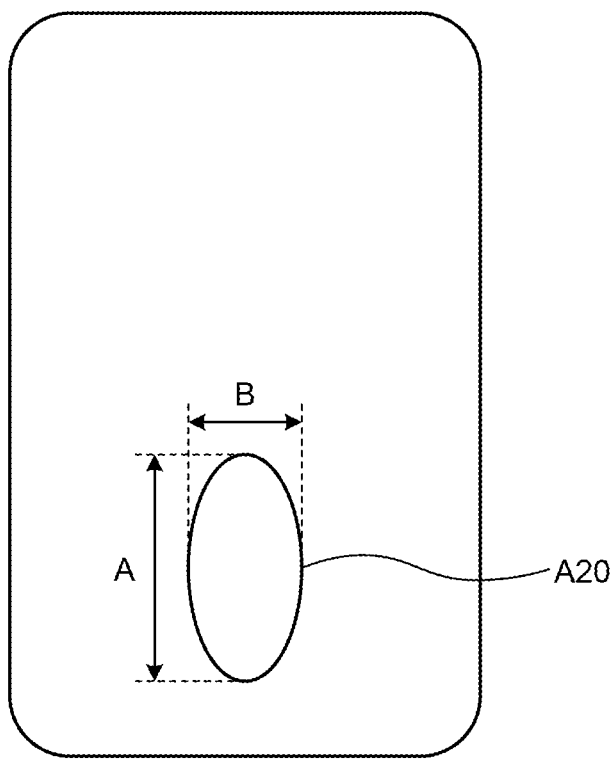
FIG. 2 is a diagram schematically illustrating a contact region on a surface of a touch panel unit.

Here, $P_{before\ correction}$ is the press pressure that the pressure correcting unit 14 has received from the press pressure detecting unit 13, and $P_{after\ correction}$ is the corrected pressure parameter. Furthermore, A is the length of the long diameter of the contact region detected by the touch region detecting unit 12. FIG. 2 is a diagram schematically illustrating a contact region on the surface of the touch panel unit. A long diameter A of a contact region A20 illustrated in FIG. 2 corresponds to A in Equation (2). Incidentally, B in FIG. 2 indicates a short diameter of the contact region A20.

The process control unit 15 specifies an execution target process based on the contact position received from the touch region detecting unit 12. For example, when the contact position overlaps a display position of an icon, the process control unit 15 specifies a process corresponding to the icon. Furthermore, the process control unit 15 determines whether "confirmation operation" is performed based on the corrected pressure parameter and a threshold. The "confirmation operation" is operation to confirm execution of a process. For example, when the corrected pressure parameter is equal to or greater the threshold, the process control unit 15 determines that the confirmation operation is performed and performs the execution target process. In contrast, when the corrected pressure parameter is smaller than the threshold, the process control unit 15 determines that the confirmation operation is not performed and does not perform the execution target process.

Example of Operation Performed by Electronic Device

Figure 3:
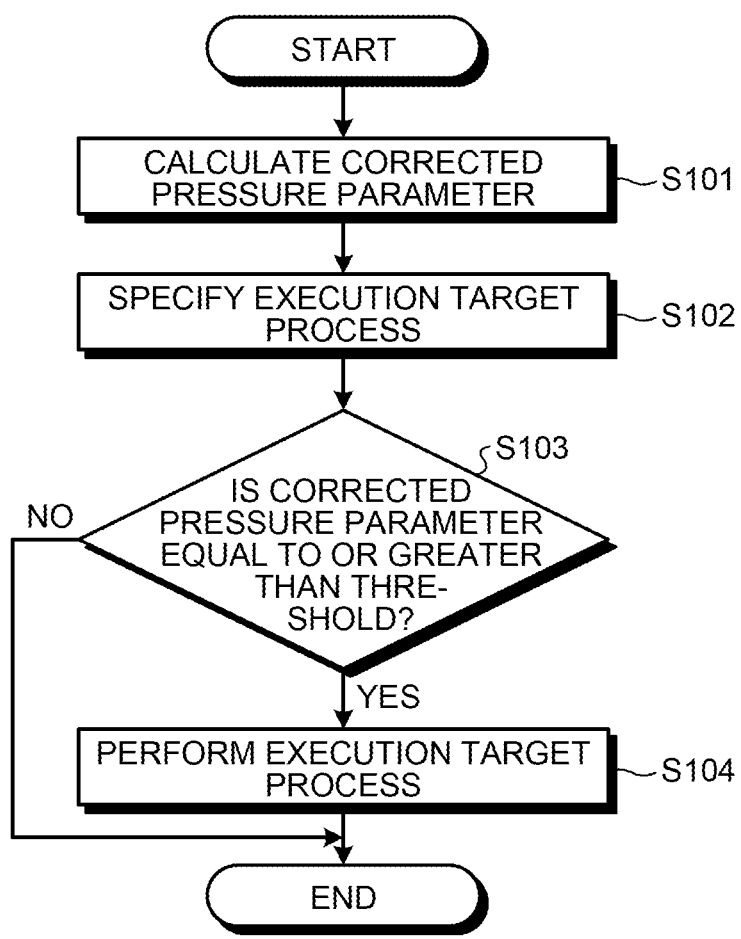
FIG. 3 is a flowchart illustrating an example of processing operation performed by the electronic device according to the first embodiment.

An example of processing operation performed by the electronic device 10 with the above configuration will be described below. FIG. 3 is a flowchart illustrating an example of the processing operation performed by the electronic device according to the first embodiment. In particular, the processing operation performed by the pressure correcting unit 14 and the process control unit 15 will be described below.

The pressure correcting unit 14 calculates a corrected pressure parameter by correcting the press pressure based on the parameter of the contact area received from the touch region detecting unit 12 (Step S101). Therefore, even when the touch panel unit 11 is pressed with the same pressure, it becomes possible to reduce the corrected pressure parameter obtained when the touch panel unit is pressed with a pad of a finger as compared to the corrected pressure parameter obtained when the touch panel unit is pressed with a tip of a finger.

The process control unit 15 specifies an execution target process based on the contact position received from the touch region detecting unit 12 (Step S102).

The process control unit 15 determines whether the corrected pressure parameter calculated by the pressure correcting unit 14 is equal to or greater than a threshold (Step S103).

When the corrected pressure parameter is equal to or greater than the threshold (YES at Step S103), the process control unit 15 determines that the confirmation operation is performed, and performs the execution target process specified at Step S102 (Step S104). In contrast, when the corrected pressure parameter is smaller than the threshold (NO at Step S103), the process control unit 15 determines that the confirmation operation is not performed, and does not perform the execution target process specified at Step S102.

Incidentally, when the touch panel unit 11 is touched by the pad of the finger, it is unlikely that certain operation (for example, the confirmation operation) other than scroll operation is performed. Therefore, when the touch panel unit 11 is touched by the pad of the finger, the corrected pressure parameter is relatively reduced in order to reduce the possibility to determine that the certain operation other than the scroll operation is performed and reduce the frequency of the erroneous operation by a user.

Incidentally, the processes from Step S101 to Step S104 may be repeated with certain periods.

As described above, according to the first embodiment, the pressure correcting unit 14 of the electronic device 10 calculates the corrected pressure parameter by correcting the press pressure applied by a contact object to the touch panel unit 11 based on the parameter of the contact area of the contact object on the touch panel unit 11. Furthermore, the process control unit 15 determines whether the confirmation operation is performed based on the corrected pressure parameter and the threshold.

According to the electronic device 10 configured as described above, it becomes possible to use the contact area of a finger, which differs between when a user intends to perform the confirmation operation and when the user does not intend to perform the confirmation operation, such that the press pressure obtained when the user does not intend to perform the confirmation operation can be corrected to reduce the possibility to determine that the confirmation operation is performed. Therefore, it becomes possible to reduce the frequency of the erroneous operation by the user. For example, it becomes possible to reduce the frequency of cases in which the scroll operation is erroneously determined as the confirmation operation.

[b] Second Embodiment

In a second embodiment, a reference threshold is corrected instead of the press pressure, and whether the certain operation is performed is determined based on the corrected threshold and the press pressure.

Configuration Example of Electronic Device

Figure 4:
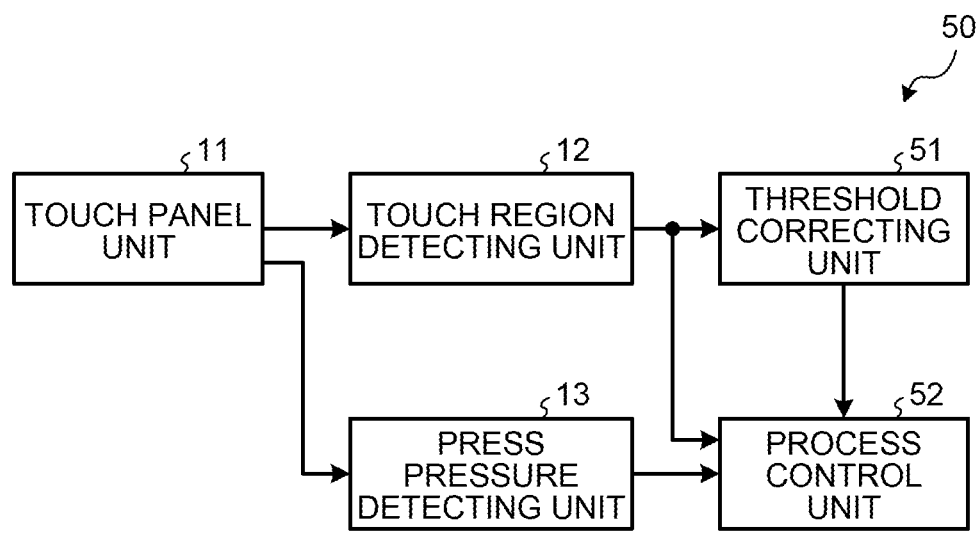
FIG. 4 is a block diagram illustrating an example of an electronic device according to a second embodiment.

FIG. 4 is a block diagram illustrating an example of an electronic device according to the second embodiment. In FIG. 4, an electronic device 50 further includes a threshold correcting unit 51 and a process control unit 52.

The threshold correcting unit 51 corrects a reference threshold based on the parameter of the contact area received from the touch region detecting unit 12, to thereby calculate a "corrected threshold". For example, the threshold correcting unit 51 calculates the corrected threshold by reducing the reference threshold as the parameter of the contact area increases. For example, the threshold correcting unit 51 multiples the reference threshold by the parameter of the contact area received from the touch region detecting unit 12, to thereby calculate the corrected threshold. For example, the threshold correcting unit 51 may calculate the corrected threshold by Equations (3) and (4) below.

$$Th_{after\ correction} = Th_{before\ correction} \times \gamma \quad (3)$$

$$\gamma = A \times \text{adjustment factor} \quad (4)$$

Here, $Th_{before\ correction}$ is the reference threshold, and $Th_{after\ correction}$ is the corrected threshold. Furthermore, A is the length of the long diameter of the contact region detected by the touch region detecting unit 12 as described above.

The process control unit 52 specifies an execution target process based on the contact position received from the touch region detecting unit 12, similarly to the process control unit 15 according to the first embodiment. Furthermore, the process control unit 52 determines whether the "confirmation operation" is performed based on the press pressure detected by the press pressure detecting unit 13 and the corrected threshold calculated by the threshold correcting unit 51. For example, when the press pressure is equal to or greater than the corrected threshold, the process control unit 52 determines that the confirmation operation is performed and performs the execution target process. In contrast, when the press pressure is smaller than the corrected threshold, the process control unit 52 determines that the confirmation operation is not performed and does not perform the execution target process.

Example of Operation Performed by Electronic Device

Figure 5:
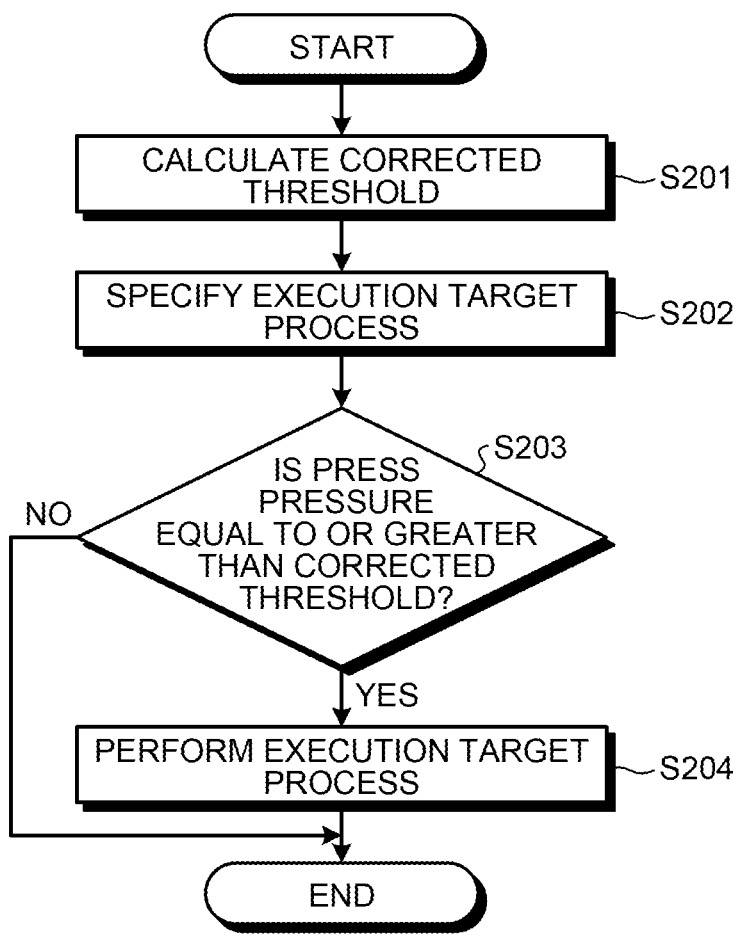
FIG. 5 is a flowchart illustrating an example of processing operation performed by the electronic device according to the second embodiment.

An example of processing operation performed by the electronic device 50 with the above configuration will be described below. FIG. 5 is a flowchart illustrating an example of the processing operation performed by the electronic device according to the second embodiment. In particular, the processing operation performed by the threshold correcting unit 51 and the process control unit 52 will be described below.

The threshold correcting unit 51 calculates a corrected threshold by correcting the reference threshold based on the parameter of the contact area received from the touch region detecting unit 12 (Step S201). Therefore, even when the touch panel unit 11 is pressed with the same pressure, it becomes possible to increase the corrected threshold used when the touch panel unit is pressed with a pad of a finger as compared to the corrected threshold used when the touch panel unit is pressed with a tip of a finger.

The process control unit 52 specifies an execution target process based on the contact position received from the touch region detecting unit 12 (Step S202).

The process control unit 52 determines whether the press pressure detected by the press pressure detecting unit 13 is equal to or greater than the corrected threshold calculated by the threshold correcting unit 51 (Step S203).

When the press pressure is equal to or greater than the corrected threshold (YES at Step S203), the process control unit 52 determines that the confirmation operation is performed and performs the execution target process specified at Step S202 (Step S204). In contrast, when the press pressure is smaller than the corrected threshold (NO at Step S203), the process control unit 52 determines that the confirmation operation is not performed and does not perform the execution target process specified at Step S202.

Incidentally, when the touch panel unit 11 is touched by the pad of the finger, it is unlikely that certain operation (for example, the confirmation operation) other than scroll operation is performed. Therefore when the touch panel unit 11 is touched by the pad of the finger, the corrected threshold is relatively increased in order to reduce the possibility to determine that the certain operation other than the scroll operation is performed and reduce the frequency of the erroneous operation by a user.

Incidentally, the processes from Step S201 to Step S204 may be repeated with certain periods.

As described above, according to the second embodiment, the threshold correcting unit 51 of the electronic device 50 calculates the corrected threshold by correcting the reference threshold based on the parameter of the contact area of the contact object on the touch panel unit 11. Furthermore, the process control unit 52 determines whether the certain operation is performed based on the press pressure of the contact object on the touch panel unit 11 and the corrected threshold.

According to the electronic device 50 configured as described above, it becomes possible to use the contact area of a finger, which differs between when a user intends to perform the confirmation operation and when the user does not intend to perform the confirmation operation, such that the threshold used when the user does not intend to perform the confirmation operation can be corrected to reduce the possibility to determine that the confirmation operation is performed. Therefore, it becomes possible to reduce the frequency of the erroneous operation by the user. For example, it becomes possible to reduce the frequency of cases in which the scroll operation is erroneously determined as the confirmation operation.

[c] Other Embodiments

[1] In the first and the second embodiments, the process control unit 15 and the process control unit 52 employ the "confirmation operation" as target operation to determine whether the target operation is performed or not. However, the target operation is not limited to the confirmation operation. For example, selection operation may be employed as the target operation.

[2] The correction process in the first and the second embodiments may be performed only when the parameter of the contact area is equal to or greater than a certain value, and may be omitted from being performed when the parameter of the contact area is smaller than the certain value. In other words, it may be possible to set the lower limit of the parameter of the contact area in the correction process of the first and the second embodiments.

For example, the pressure correcting unit 14 according to the first embodiment may correct the press pressure to calculate the corrected pressure parameter only when the parameter of the contact area received from the touch region detecting unit 12 is equal to or greater than the certain value. In contrast, when the parameter of the contact area received from the touch region detecting unit 12 is smaller than the certain value, the pressure correcting unit 14 may output the press pressure to the process control unit 15 without any correction. When the parameter of the contact area is equal to or greater than the certain value, the process control unit 15 determines whether the confirmation operation is performed based on the corrected pressure parameter and the threshold. In contrast, when the parameter of the contact area is smaller than the certain value, the process control unit 15 determines whether the confirmation operation is performed based on the press pressure and the threshold.

Furthermore, the threshold correcting unit 51 according to the second embodiment may correct the reference threshold to calculate the corrected threshold only when the parameter of the contact area received from the touch region detecting unit 12 is equal to or greater than a certain value. In contrast, when the parameter of the contact area received from the touch region detecting unit 12 is smaller than the certain value, the threshold correcting unit 51 may output the reference threshold to the process control unit 52 without any correction. When the parameter of the contact area is equal to or greater than the certain value, the process control unit 52 determines whether the confirmation operation is performed based on the press pressure and the corrected threshold. In contrast, when the parameter of the contact area is smaller than the certain value, the process control unit 52 determines whether the confirmation operation is performed base on the press pressure and the reference threshold.

[3] The correction process in the first and the second embodiments may be performed only when the press pressure is equal to or greater than a certain value, and may be omitted from being performed when the press pressure is smaller than the certain value. In other words, it may be possible to set the lower limit of the press pressure in the correction process of the first and the second embodiments.

For example, the pressure correcting unit 14 according to the first embodiment may correct the press pressure to calculate the corrected pressure parameter only when the press pressure received from the press pressure detecting unit 13 is equal to or greater than the certain value. In contrast, when the press pressure received from the press pressure detecting unit 13 is smaller than the certain value, the pressure correcting unit 14 may outputs the press pressure to the process control unit 15 without correction. When the press pressure is equal to or greater than the certain value, the process control unit 15 determines whether the confirmation operation is performed based on the corrected pressure parameter and the threshold. In contrast, when the press pressure is smaller than the certain value, the process control unit 15 determines whether the confirmation operation is performed based on the press pressure and the threshold.

Furthermore, the threshold correcting unit 51 according to the second embodiment may correct the reference threshold to calculate the corrected threshold only when the press pressure received from the press pressure detecting unit 13 is equal to or greater than a certain value, although this is not illustrated in FIG. 4. In contrast, when the press pressure received from the press pressure detecting unit 13 is smaller than the certain value, the threshold correcting unit 51 may output the reference threshold without correction to the process control unit 52. When the press pressure is equal to or greater than the certain value, the process control unit 52 determines whether the confirmation operation is performed based on the press pressure and the corrected threshold. In contrast, when the press pressure is smaller than the certain value, the process control unit 52 determines whether the confirmation operation is performed based on the press pressure and the reference threshold.

[4] The components illustrated in the drawings of the first and the second embodiments do not necessarily have to be physically configured in the manner illustrated in the drawings. In other words, specific forms of distribution and integration of the components are not limited to those illustrated in the drawings, and all or part of the components can be functionally or physically distributed or integrated in arbitrary units depending on various loads or use conditions.

Furthermore, all or an arbitrary part of the processing functions implemented by the apparatuses may be realized by a central processing unit (CPU) (or a micro computer, such as a micro processing unit (MPU) or a micro controller unit (MCU)). Furthermore, all or an arbitrary part of the processing functions may be realized by a program analyzed and executed by a CPU (or a micro computer, such as an MPU or a MCU), or may be realized by hardware using wired logic.

The electronic device according to the first and the second embodiments is realized by, for example, a hardware configuration as described below.

Figure 6:
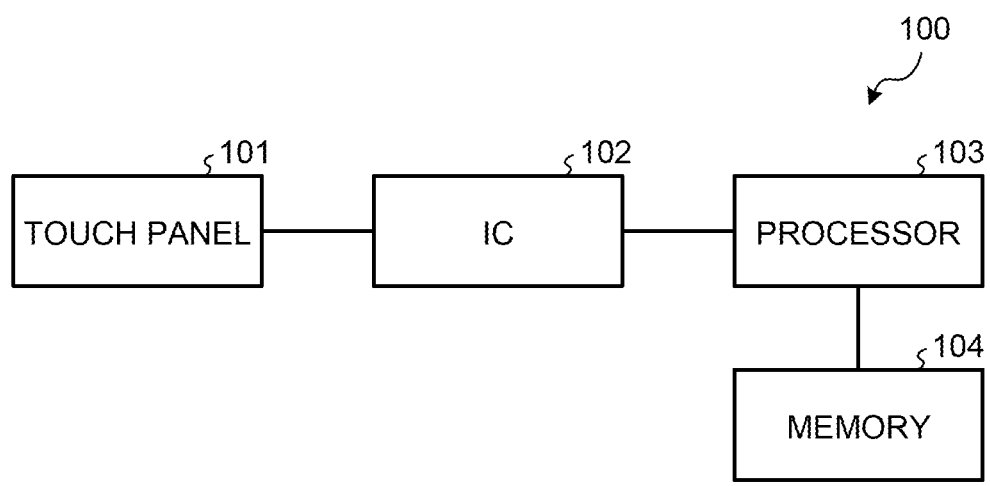
FIG. 6 is a diagram illustrating a hardware configuration example of the electronic device.

FIG. 6 is a diagram illustrating a hardware configuration example of the electronic device. As illustrated in FIG. 6, an electronic device 100 includes a touch panel 101, an integrated circuit (IC) 102, a processor 103, and a memory 104. Incidentally, each of the electronic device 10 and the electronic device 50 has the hardware configuration as illustrated in FIG. 6.

Examples of the processor 103 includes a CPU, a digital signal processor (DSP), and a field programmable gate array (FPGA). Furthermore, examples of the memory 104 include a random access memory (RAM), such as a synchronous dynamic random access memory (SDRAM), a read only memory (ROM), and a flash memory.

The processing functions implemented by the electronic device according to the first and the second embodiments may be realized by causing a processor provided in an amplifier to execute programs stored in various memories, such as a non-volatile storage medium. For example, it may be possible to store programs corresponding to the processes performed by the pressure correcting unit 14, the process control units 15 and 52, and the threshold correcting unit 51 in the memory 104, and cause the processor 103 to perform each of the programs. Furthermore, the processes performed by the pressure correcting unit 14, the process control units 15 and 52, and the threshold correcting unit 51 may be distributed to multiple processors. Moreover, the touch region detecting unit 12 and the press pressure detecting unit 13 may be implemented by the IC 102. Alternatively, the touch region detecting unit 12 and the press pressure detecting unit 13 may be implemented by separate ICs.

According to an embodiment of the present invention, it becomes possible to reduce the frequency of erroneous operation by a user.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. An electronic device comprising:
a touch panel;
a memory; and
a processor that is connected to the memory, wherein
the processor is configured to calculate a corrected pressure parameter by correcting a parameter of pressure applied by a contact object to the touch panel based on a parameter of a contact area of the contact object on the touch panel, and is configured to determine whether a predetermined operation is performed based on the corrected pressure parameter and a threshold, wherein the parameter of the contact area is a long diameter of a contact region of the contact object on the touch panel, and the processor is configured to calculate the corrected pressure parameter by reducing the parameter of the pressure as the long diameter increases, wherein the processor is configured to multiply press pressure received from a press pressure detector by an inverse of the parameter of the contact area received from a touch region detector to calculate the corrected pressure parameter.

2. An electronic device comprising:
a touch panel;
a memory; and
a processor that is connected to the memory, wherein
the processor is configured to calculate a corrected threshold by correcting a reference threshold based on a parameter of a contact area of a contact object on the touch panel, and is configured to determine whether a predetermined operation is performed based on a parameter of pressure applied by the contact object to the touch panel and the corrected threshold, wherein the parameter of the contact area is a long diameter of a contact region of the contact object on the touch panel, and the processor is configured to calculate the corrected threshold by increasing the reference threshold as the long diameter increases, wherein the processor is configured to multiply the reference threshold by the parameter of the contact area received from a touch region detector to calculate the corrected threshold.

3. A computer-readable, non-transitory, recording medium having stored therein a control program for causing an electronic device including a touch panel to execute a process, the process comprising:

calculating a corrected pressure parameter by correcting a parameter of pressure applied by a contact object to the touch panel based on a parameter of a contact area of the contact object on the touch panel; and determining whether a predetermined operation is performed based on the corrected pressure parameter and a threshold, wherein the parameter of the contact area is a long diameter of a contact region of the contact object on the touch panel, and the calculating includes calculating the corrected pressure parameter by reducing the parameter of the pressure as the long diameter increases, wherein the calculating includes multiplying press pressure received from a press pressure detector by an inverse of the parameter of the contact area received from a touch region detector to calculate the corrected pressure parameter.

* * * * *